(12) United States Patent
Fine et al.

(10) Patent No.: US 8,670,711 B2
(45) Date of Patent: Mar. 11, 2014

(54) METHOD OF DETECTING A NFC DEVICE EMULATING SEVERAL CONTACTLESS CARDS WHICH MAY USE A PLURALITY OF PROTOCOLS

(75) Inventors: Jean-Yves Fine, Marseilles (FR); Alain Rhelimi, Ceyreste (FR)

(73) Assignee: Gemalto SA, Meudon (FR)

( * ) Notice: Subject to any disclaimer, the term of this patent is extended or adjusted under 35 U.S.C. 154(b) by 154 days.

(21) Appl. No.: 13/263,560

(22) PCT Filed: Apr. 6, 2010

(86) PCT No.: PCT/EP2010/054530
§ 371 (c)(1),
(2), (4) Date: Oct. 7, 2011

(87) PCT Pub. No.: WO2010/115889
PCT Pub. Date: Oct. 14, 2010

(65) Prior Publication Data
US 2012/0028579 A1 Feb. 2, 2012

(30) Foreign Application Priority Data
Apr. 9, 2009 (EP) .................................. 093053023

(51) Int. Cl.
*H04B 5/00* (2006.01)
(52) U.S. Cl.
USPC ....... 455/41.1; 340/10.1; 340/10.2; 340/10.4; 340/10.41; 340/10.42; 340/13.24; 340/13.26; 340/13.28; 340/13.29
(58) Field of Classification Search
USPC ................ 340/10.1, 10.2, 10.33, 10.4, 10.41, 340/10.42, 10.5, 13.24, 13.26, 13.28, 340/13.29; 370/310; 719/313; 455/41.1, 455/411, 557, 558
See application file for complete search history.

(56) References Cited

U.S. PATENT DOCUMENTS

| | | | |
|---|---|---|---|
| 7,053,754 B2* | 5/2006 | Mani | 340/10.2 |
| 7,952,464 B2* | 5/2011 | Nikitin et al. | 340/10.1 |
| 2007/0274242 A1* | 11/2007 | Lamacraft et al. | 370/310 |
| 2009/0199206 A1* | 8/2009 | Finkenzeller et al. | 719/313 |

FOREIGN PATENT DOCUMENTS

DE   10 2006 027 200 A1   12/2007

OTHER PUBLICATIONS

Vaidya, Nitin and Das, Samir R. "RFID-Based Networks—Exploiting Diversity and Redundancy"; ACM SIGMOBILE Mobile Computing and Communications Review, vol. 12, No. 1, Jan. 1, 2009, pp. 2-14.*

(Continued)

*Primary Examiner* — Tuan A Tran
(74) *Attorney, Agent, or Firm* — Buchanan Ingersoll & Rooney PC

(57) ABSTRACT

The invention is a method of managing a NFC transaction between two hosts and a reader device. The two hosts are embedded in NFC devices and are intended to be identified by the reader device during an anti-collision phase through a first identifier and a second identifier respectively. The first identifier comprises a variable part. The method includes the steps of generating the first identifier, the variable part of the first identifier and the second identifier comprising a common pattern, looking for a common pattern into the first and second identifiers on the reader device side, and if a common pattern is found and if the variable part of the first identifier comprises said common pattern, concluding that the first and second hosts are embedded in a unique NFC device.

13 Claims, 3 Drawing Sheets

(56) References Cited

OTHER PUBLICATIONS

International Search Report (PCT/ISA/210) issued on Aug. 8, 2010, by European Patent Office as the International Searching Authority for International Application No. PCT/EP2010/054530.

Nitin Vaidya, Samir R. Das, "RFID-based networks: exploiting diversity and redundancy", ACM SIGMOBILE Mobile Computing and Communications Review, vol. 12, No. 1, Jan. 1, 2009, pp. 2-14.

* cited by examiner

METHOD OF DETECTING A NFC DEVICE EMULATING SEVERAL CONTACTLESS CARDS WHICH MAY USE A PLURALITY OF PROTOCOLS

FIELD OF THE INVENTION

The present invention relates to methods of detecting a NFC device emulating several contactless cards which may use a plurality of communication protocols. It relates particularly to methods of detecting the number of physical NFC devices which are present near a NFC reader.

PRIOR ART

The NFC (Near Field Communication) technology is based on the exchanging of data via a magnetic field. A NFC reader has an antenna which is able to modulate the magnetic field and to provide energy to NFC devices. The NFC reader is usually named a PCD (Proximity Coupling Device). The NFC device may be a PICC (Proximity Integrated Circuit Card or Proximity Card) or may embed components which act as logical PICC. The PICC and the PCD communicate thanks to an inductive coupling in a field frequency equal to 13.56 MHz. In particular, the ISO14443 and ISO18092 standards provide modulation technologies and communication protocols which may be used in NFC domain.

Several physical PICC may be present in the magnetic field of a PCD. That is why specific process allowing the PCD to enumerate the PICC have been defined. These processes are named anti-collision mechanisms. Two main anti-collision strategies are usually carried out. The first one is a determinist method which is bit-oriented and the second one is a statistical method which is frame-oriented.

The determinist method is defined in the part 3 of the ISO14443 standard and is mainly used for products compliant with the ISO14443-A type. The statistical method is defined in the part 3 of the ISO14443 standard and is mainly used for products compliant with the ISO14443-B type or ISO18092.

In both anti-collision methods, each PICC sends its own identifier which may be called UID (Unique IDentifier) or PUPI (Pseudo Unique Proxcard Identifier). The PCD uses the received identifier for selecting a PICC according to the targeted application. Whatever the anti-collision strategy used, each identifier has a unique value that may change from a transaction to another one. Whatever the standard used, all the identifiers transmitted by the PICC are assumed to be different according to the principle described in the standards.

A NFC device may emulate a plurality of PICC which may use several communication protocols. The PCD is unable to detect if the detected PICC are several different physical devices or are PICC emulated by a single NFC device which has a unique antenna.

There is a need for allowing a NFC reader to distinguish a set of physical PICC from a set of emulated PICC which are logical PICC.

SUMMARY OF THE INVENTION

An object of the invention is to solve the above mentioned technical problem.

The object of the present invention is a device comprising first and second hosts and a NFC controller. Each host corresponds to a logical PICC. The first host is intended to communicate with a reader device via a first contactless communication protocol. The second host is intended to communicate with the reader device via a second contactless communication protocol. The first host is intended to be identified by the reader device during an anti-collision phase through a first identifier. The second host is intended to be identified by the reader device during an anti-collision phase through a second identifier. The first identifier comprises a variable part. The portable device comprises a means which is capable of generating the first identifier so that the variable part of the first identifier and the second identifier comprise a common pattern.

In one embodiment the first host may be the second host and first and second communication protocols may be different.

Said first and second identifiers may be identical and said first and second communication protocols may be different.

Alternatively, said first and second communication protocols may be identical and said first and second hosts may be different.

In a preferred embodiment, the second identifier may comprise a variable part and the means may be capable of generating the second identifier.

Advantageously, the means may be capable of generating the first identifier from said second identifier.

Any one of said first and second hosts may be a secure host.

Advantageously, the means may be capable of sending the first identifier to the first host.

Advantageously, the means is the NFC controller.

In a preferred embodiment, said device may be a portable device, such as a mobile phone.

Each of said first and second communication protocols may comply with the ISO14443-A, ISO14443-B, ISO15693, ISO18092-F or JISX6319-F standards.

Another object of the invention is a device intended to communicate via the NFC technology with at least first and second hosts. The device acts as a NFC reader. Said first and second hosts are connected to a NFC controller. The first host is intended to be identified by said device during an anti-collision phase through a first identifier which comprises a variable part. The second host is intended to be identified by said device during an anti-collision phase through a second identifier. Said device comprises a first means capable of looking for a common pattern into said first and second identifiers. Said device comprises a second means capable of concluding that said first and second hosts are embedded in a unique NFC device if a common pattern is found and if the variable part of said first identifier comprises said common pattern.

Another object of the invention is method for managing a NFC transaction between first and second hosts and a NFC reader device. First host is embedded in first NFC device and is intended to be identified by the reader device during an anti-collision phase through a first identifier. The first identifier comprises a variable part. Second host is embedded in second NFC device and is intended to be identified by the reader device during an anti-collision phase through a second identifier. The method comprises the following steps:
  generating the first identifier so that the variable part of said first identifier and the second identifier comprise a common pattern,
  on the reader device side, looking for a common pattern into said first and second identifiers,
  if a common pattern is found and if the variable part of the first identifier comprises the found common pattern, concluding that said first and second hosts are embedded in a unique NFC device.

Advantageously, the method may comprise the further step in case of successful common pattern search:

on the reader device side, updating the communication parameters which are used by the reader device for communicating with first and second hosts.

Advantageously, the method may comprise the step of sending the first identifier to the first host after the generation step.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of device comprising a NFC controller, an antenna and which is able to manage a plurality of logical PICC. These devices may be portable devices like mobile phone or Electronic Funds Transfer Terminals for payment. These devices may also be fixed devices like smartposter as known as tag.

The invention relies on the fact that the standards relevant for the NFC domain lead to generate PICC identifiers which are different for each PICC. The identifier generation is mainly achieved by using random values.

An advantage of the invention is to allow the PCD to detect how many antennas are physically present in its magnetic field. Thus the NFC reader may adapt the physical and protocol parameters in order to optimize the contactless communication. This optimization is important since the coupling of antennas modify the behavior of the PCD antenna and impacts the communication bandwidth and the noise immunity.

Moreover the sharing of the magnetic field between several NFC antennas leads to a decrease of the energy available for each NFC antenna. Thanks to the update of the communication parameters the success of the full contactless transaction may be improved. The invention avoids that a PCD aborts a contactless transaction when too many PICC are simultaneously detected.

Thanks to the invention the PCD is able to determine the nature of the detected PICC: either physical or logical PICC.

Another advantage of the invention is to inform an application running on PCD side of the number of physical NFC devices which are present in the magnetic field. If a single NFC device has been detected, the application may try to communicate with the single NFC device itself or may take advantage of the fact that all detected PICC share common physical resources and a coherent user's management related to the use of multiple PICC.

Figure 1:
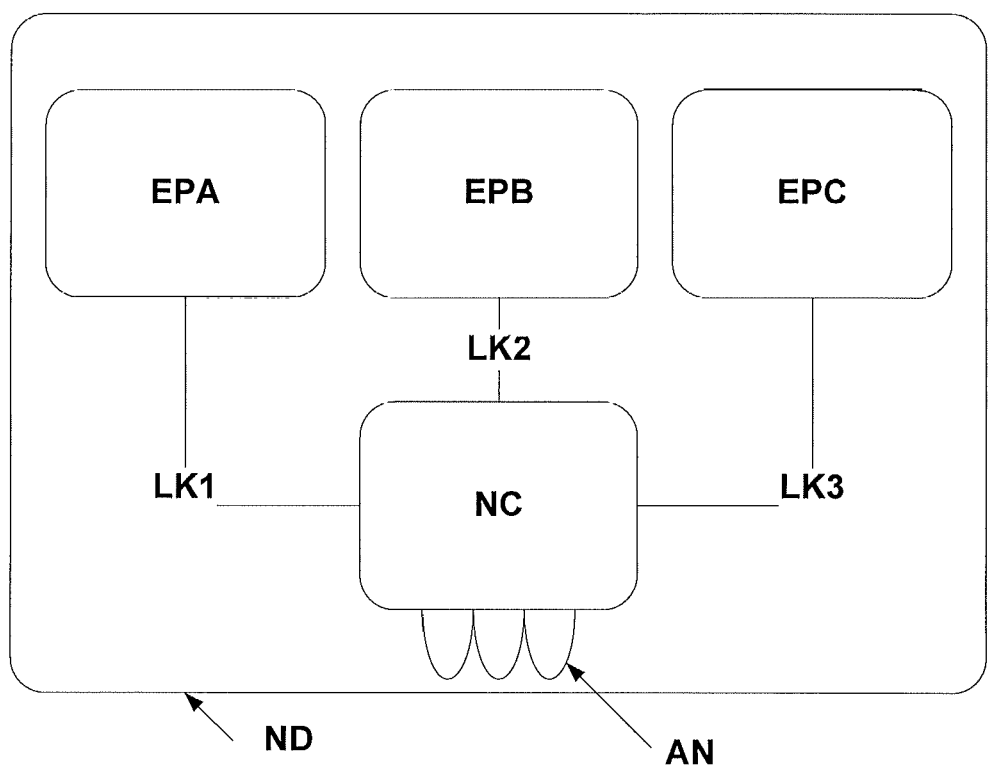
FIG. 1 depicts schematically an example of architecture of a NFC device of Mobile phone type according to the invention.

FIG. 1 shows the architecture of a device of Mobile phone type according to the invention.

The device ND comprises an antenna AN, a NFC controller NC and three hosts EPA, EPB and EPC. Each host corresponds to a logical PICC. Each host may be secure or not. For example the host may be a digital Base band or an application processor. In a preferred embodiment EPA is a SIM card which is a secure host; EPB is a host dedicated to an access application and EPC is a host dedicated to a banking application. The three hosts are linked to the NFC controller NC via three digital links LK1, LK2 and LK3. In particular the three links may be implemented with the SWP (TS 102.613), the I2C or the NFC WI (ECMA 373) standards.

In a preferred embodiment, the NFC controller NC fully manages the contactless protocols between a NFC reader and the hosts EPA, EPB and EPC. The contactless protocol may be compliant with ISO14443, ISO18092 or ISO15693 standards. The contactless protocol may also comply with proprietary specifications. Each host may use a communication protocol different from the other hosts.

Alternatively, the anti-collision phase may be managed by the host itself. In such a case, the NFC controller NC is in charge of the modulation/demodulation of the magnetic field and transfers the protocol frames from the NFC reader to the host and vice versa.

In a preferred embodiment, the NFC controller NC is in charge of generating the identifiers of the hosts.

Figure 2:
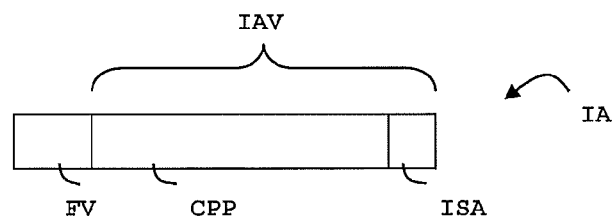
FIG. 2 is an example of structure of an identifier of a PICC emulated in a NFC device according to the invention.

FIG. 2 shows an example of structure of an identifier of a PICC emulated in a NFC device according to the invention. The identifier IA comprises a fixed part FV and a variable part IAV. The fixed part FV contains a fixed value. The fixed value may be defined by the used communication protocol standard or by the application requirements.

The variable part IAV is intended to guarantee that two identifiers are different.

According to the invention, the variable part IAV contains a pattern CPP which is common to all the identifiers of PICC emulated in one NFC device. The common pattern CPP allows a NFC reader to detect that the detected PICC belong to a same and unique NFC device. In other words, the common pattern CPP acts as a unique identifier for the NFC device ND itself and the difference between the identifiers will force the reader to enumerate all PICC in its field.

The variable part IAV also contains an index ISA which is intended to distinguish the identifiers of PICC belonging to the same and unique NFC device. The index ISA is a small identifier specific to the corresponding emulated PICC. In a preferred embodiment the size of the index ISA is as small as possible so that the pattern is the longest possible. In particular, for two emulated PICC, the index size is equal to 1 bit, for four emulated PICC, the index size is equal to 2 bits, and for eight emulated PICC, the index size is equal to 3 bits, and so on.

Usually, the identifiers are 32-bits longs. For instance, if two identifiers have a fixed part set at the value 0101010101010101, the common pattern may be set to 110110110110110 and the index may be set to 0 for the first identifier and set to 1 for the second identifier. As a result the first identifier is 01010101010101011101101101101100 and the second identifier is 01010101010101011101101101101101.

Alternatively, the identifier IA may comprise only a variable part.

In another embodiment, two identifiers generated according to the invention may have the same value if carried on different RF technology. That is to say there is no index specific to each emulated PICC. Such an example is shown at FIG. 3.

Figure 3:
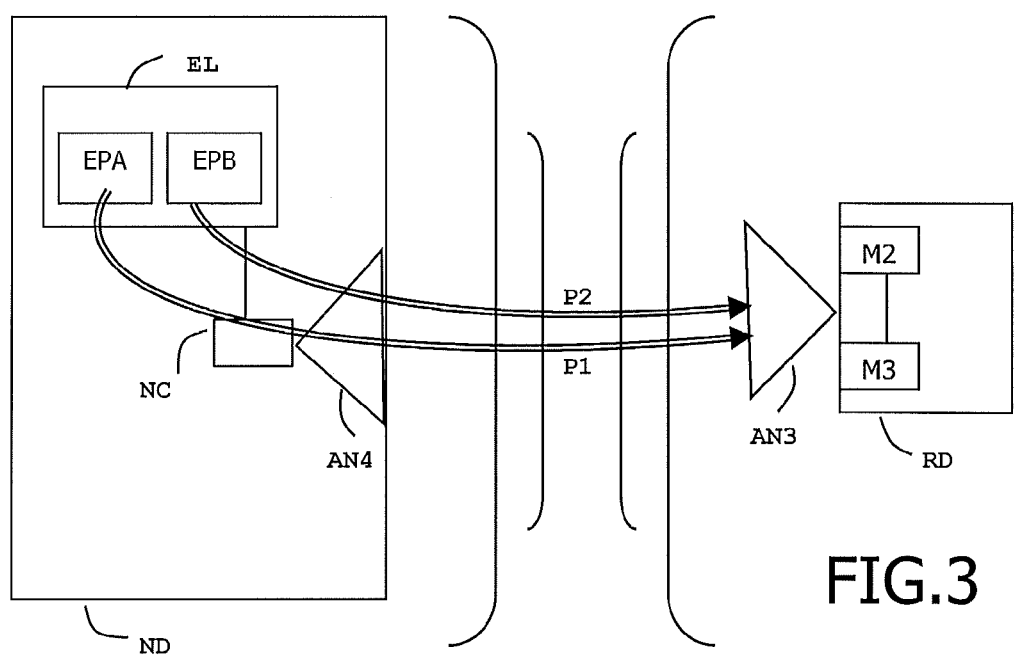
FIG. 3 is an example of system where a NFC reader communicates with two emulated PICC embedded in a single NFC device according to the invention.

As shown in FIG. 3, a NFC reader RD communicates with an element EL which is able to manage two hosts EPA and EPB. The emulated host EPA is intended to communicate through a first communication protocol P1 and the emulated host EPB is intended to communicate through a second communication protocol P2 which is different from P1. For example, the first protocol P1 may comply with ISO14443-A and the second protocol P2 may comply with ISO14443-B. The element EL is embedded in a single NFC device ND according to the invention. The reader RD has an antenna AN3 which allows a contactless communication thanks to a coupling with the antenna AN4 of the NFC device ND. The NFC device ND comprises a NFC controller NC which is connected to the element EL. The two hosts EPA and EPB may have identifiers sharing the same value. Since a same identifier value is received through two different communication protocols, the NFC reader RD is able to identify the two hosts EPA and EPB.

Figure 4:
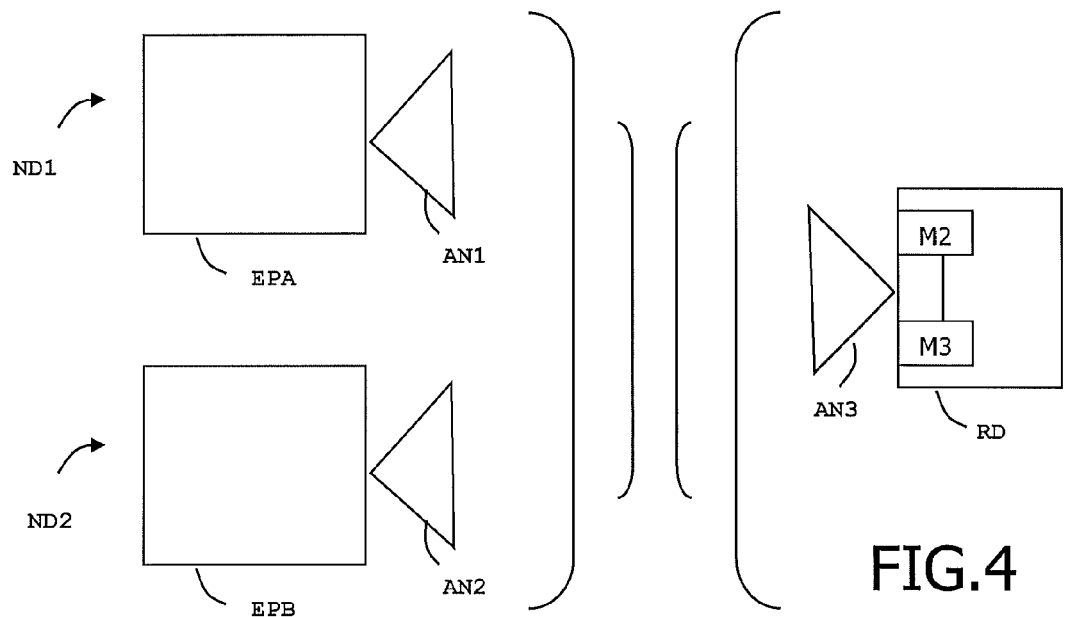
FIG. 4 is an example of system where a NFC reader communicates with two physical PICC.

FIG. 4 shows an example of system where a NFC reader RD communicates with two physical NFC devices ND1 and ND2. In this example the two NFC devices are two contactless smart cards. ND1 comprises an antenna AN1 allowing to communicate thanks to a coupling with the antenna AN3 of the reader RD. ND2 comprise also an antenna AN2 able to communicate with AN3. The first card ND1 comprises a host EPA which is intended to use an identifier IA. The second card ND2 comprises a host EPB which is intended to use an identifier IB. The NFC reader RD comprises two means M2 and M3. The first means M2 is able to look for a common pattern into the received identifiers during the anti-collision phase. The second means M3 is able to conclude that the identifiers comprising the found common pattern correspond to emulated PICC embedded in a single NFC device. In particular, the common pattern must be found in the variable part of at least one identifier.

In the example of FIG. 4, the two identifiers IA and IB are randomly generated for each contactless transaction. When the two cards ND1 and ND2 are placed in the magnetic field of the reader RD, the two identifiers IA and IB are received by the reader RD. The first means M2 looks for a common pattern into the two received identifiers. A common pattern is considered as being found if at least three consecutive bits have the same value at the same position in the variable part of the two identifiers IA and IB. Since IA and IB contain random values, the probability to find a common pattern is extremely low. Thus no common pattern is found and the reader RD concludes that there are two physical NFC devices in its magnetic field. In other words, the reader RD is able to conclude that there are two antennas in its magnetic field because physically separated PICC have no means to negotiate a common pattern in their identifiers.

Figure 5:
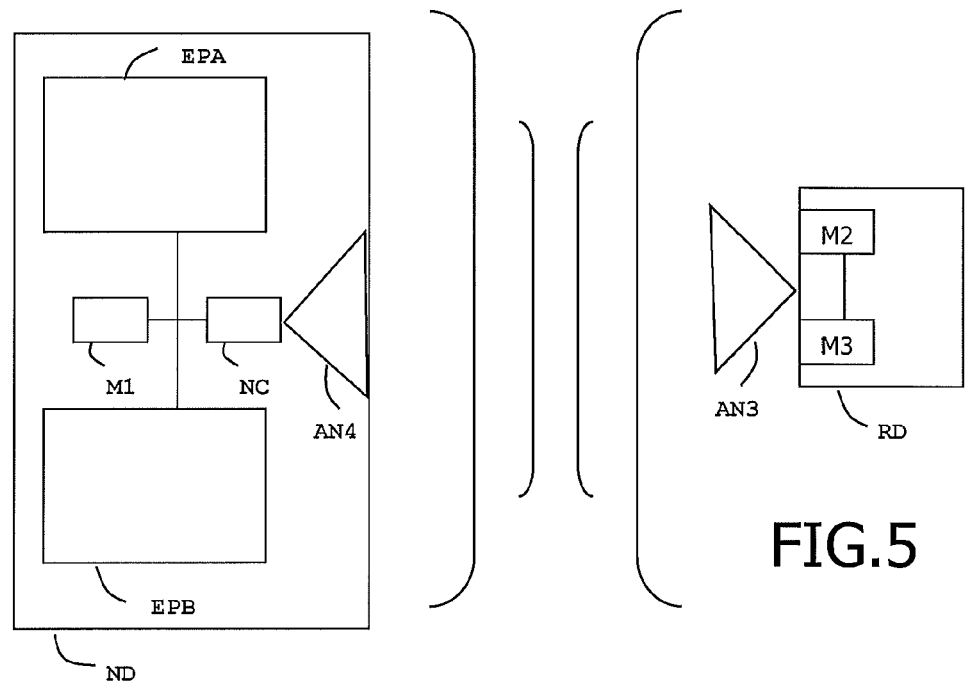
FIG. 5 is an example of system where a NFC reader communicates with two PICC embedded in a single NFC device according to the invention.

FIG. 5 shows an example of system where a NFC reader RD communicates with two emulated PICC embedded in a single NFC device ND.

In this embodiment the two emulated PICC are two hosts EPA and EPB comprised in a NFC device ND. For instance, the NFC device ND may be a mobile phone, the first host EPA may be a SIM card and the second host EPB may be dedicated to a transport application. During the anti-collision phase, the first host EPA is intended to use an identifier IA and the second host EPB is intended to use an identifier IB. In this embodiment both identifiers IA and IB comprise a variable part. The NFC device ND comprises a NFC controller NC and a means M1 which are connected to the two emulated PICC. When the device ND is placed in the magnetic field of the reader RD, the means M1 generates the identifiers IA and IB by generating a common pattern CCP and two specific indexes which are assigned to each of said variable parts. Advantageously, the generated identifiers IA and IB are sent to EPA and EPB respectively. Then the two identifiers are sent to the reader RD. The reader RD comprises an antenna AN3 and two means M2 and M3. During the anti-collision step, the means M2 looks for the presence of a common pattern into the received identifiers IA and IB and checks that the variable part of at least one identifier comprises the found common pattern CCP. If a common pattern is found the means M3 concludes that the two identifiers IA and IB correspond to two hosts EPA and EPB which are embedded in a unique NFC device which has only one antenna.

In a preferred embodiment the identifiers of all hosts belonging to a single NFC device are generated according to the invention.

Alternatively, the value of one identifier may be fully fixed. In particular the identifier value may be built according to a specific standard. In such a case, the means M1 retrieve the fixed identifier from the corresponding host. Then the identifiers of the other hosts belonging to the NFC device are generated on the base of the identifier having a fixed value. In other words, the common pattern CPP is extracted from the fixed identifier.

The generated identifiers may be sent to the corresponding host by the means M1 if the application running in the host needs to know the identifier because used for diversification purposes (e.g. cryptography) or selection (e.g. JIS-X6319-4).

Advantageously, the means M1 and the NFC controller NC are merged in one entity. Alternatively, the means M1 may be implemented in a microprocessor.

Thanks to the invention the NFC reader RD is able to detect the number of antenna physically present in its magnetic field. Thus the reader RD may set its communication parameters in order to optimize the contactless session.

Moreover the invention is useful for the NFC readers that change their applicative behavior when several antennas are in their magnetic field.

The invention claimed is:

1. A device comprising:
    a NFC controller; and
    first and second hosts, wherein
        said first and second hosts are configured to communicate with a reader device via a first communication protocol and a second communication protocol, respectively, and
        said first and second hosts have a first identifier and a second identifier, respectively, so as to be identified by the reader device during an anti-collision phase, said first identifier comprising a variable part, where said variable part and the second identifier comprise a common pattern,
    wherein said device further comprises a means configured to (i) generate said first identifier of said first host and (ii) send said first identifier to said first host, and
    wherein said first host sends the first identifier to the reader device during the anti-collision phase.

2. A device according to claim 1, wherein the first host and the second host are merged in one component and wherein said first and second communication protocols are different.

3. A device according to claim 1, wherein said first and second identifiers are identical and wherein said first and second communication protocols are different.

4. A device according to claim 1, wherein said first and second communication protocols are identical and wherein said first and second hosts are different.

5. A device according to claim 1, wherein the second identifier comprises a variable part and wherein the means is able to generate said second identifier.

6. A device according to claim 1, wherein the means is able to generate said first identifier from said second identifier.

7. A device according to claim 1, wherein said first and/or said second hosts are secure hosts.

8. A device according to claim 1, wherein the means is the NFC controller.

9. A device according to claim 1, wherein said device is a portable device.

10. The device according to claim 9, wherein the portable device is a mobile phone.

11. A device according to claim 1, wherein each of said first and second communication protocols complies with ISO14443-A, ISO14443-B, ISO15693, ISO18092-F or JISX6319-F standards.

12. A method for managing a NFC transaction between first and second hosts and a reader device, said first and second hosts being embedded in a NFC device, said first and second hosts being configured to be identified by the reader device during an anti-collision phase through a first identifier and a second identifier respectively, said first identifier comprising a variable part, wherein the method comprises the following steps:
  generating, by a generation means in the device, said first identifier, where the variable part of said first identifier and the second identifier comprise a common pattern,
  sending, by the generation means, the first identifier to the first host;
  sending, by the first host, the first identifier to the reader device during the anti-collision phase;
  looking for a common pattern in said first and second identifiers on the reader device side, and
  if a common pattern is found and if the variable part of said first identifier comprises said common pattern, concluding that said first and second hosts are embedded in a unique NFC device.

13. A method according to claim 12, wherein communication parameters are used by the reader device for communicating with said first and second hosts and wherein said method comprises the further step of:
  updating the communication parameters on the reader device side if a common pattern is found.

* * * * *